United States Patent [19]

Ziebarth et al.

[11] Patent Number: 5,585,082
[45] Date of Patent: Dec. 17, 1996

[54] SOX/NOX SORBENT AND PROCESS OF USE

[75] Inventors: Michael S. Ziebarth, Columbia, Md.; Michael J. Hager, Coraopolis, Pa.; Jean W. Beeckman, Columbia; Stanislaw Plecha, Baltimore, both of Md.

[73] Assignee: W. R. Grace & Co.-Conn., New York, N.Y.

[21] Appl. No.: 410,244

[22] Filed: Mar. 24, 1995

Related U.S. Application Data

[62] Division of Ser. No. 21,709, Feb. 24, 1993, Pat. No. 5,427,995.

[51] Int. Cl.$^6$ .............................. B01J 8/00; C01B 17/00
[52] U.S. Cl. ................. 423/244.07; 423/235; 423/239.1; 423/242.1; 423/244.01
[58] Field of Search .................... 423/235, 239.1, 423/242.1, 244.01, 244.07; 502/407, 411, 415

[56] References Cited

FOREIGN PATENT DOCUMENTS

| 0511544 | 11/1992 | European Pat. Off. ......... B01J 20/08 |
| 2328508 | 5/1977 | France ............................. B01J 13/00 |

OTHER PUBLICATIONS

JP 61/086419 (Mitsui Aluminum), May 1, 1986 –Abstract.

*Primary Examiner*—Asok Pal
*Assistant Examiner*—In Suk Bullock
*Attorney, Agent, or Firm*—Beverly J. Artale

[57] ABSTRACT

An alumina sorbent capable of adsorbing NOx and SOx from waste gases and being regenerated by heating above 650° C. is made by incorporating an alumina stabilizing agent into the sorbent. A preferred method is to add the stabilizer when the alumina is precipitated. The precipitated powder is formed subsequently into a slurry, milled and spray dried to form the stabilized spheroidal alumina particles having a particle size of less than 500 microns. These particles are impregnated with an alkali metal or alkaline earth metal to form the stabilized sorbent. Alumina stabilizers include one or more of silica, lanthana, other rare earths, titania, zirconia and alkaline earths.

4 Claims, 3 Drawing Sheets

SOX/NOX SORBENT AND PROCESS OF USE

This is a division of application Ser. No. 08/021,709, filed Feb. 24, 1993, now U.S. Pat. No. 5,427,995.

BACKGROUND OF THE INVENTION

1. Field of Invention

This invention relates to an improved sorbent for removing NOx and SOx from exhaust gases and the improved removal process using that sorbent.

2. Description of the Previously Published Art

The NOXSO process, described in U.S. Pat. No. 4,798,711, uses a porous alumina sorbent containing sodium to adsorb NOx and SOx from flue gases. The process involves using beads of a sufficient size so that they can be used in a fluidized bed system. When discussing the attrition test they use beads of 10 to 20 mesh. Since a 20 mesh screen has openings of about 840 microns, the particles will be at least 840 microns in diameter. After the adsorption the nitrogen- and sulfur-laden sorbent is regenerated by heating the sorbent in a reducing atmosphere.

In addition to other preferred reducing atmospheres for regenerating, methane gas is also disclosed. However, by using natural gas or methane the regenerator operates at a higher temperature of about 650° C. which tends to further reduce the surface area of the alumina beads.

As this NOXSO sorbent cycles back and forth from adsorption to regeneration, it undergoes transformations which reduce its surface area. In the fresh condition the alumina sorbent has a surface area on the order of about 200 $m^2/g$. After about 100 cycles the surface area of the sorbent is reduced to below 50 $m^2/g$. When the surface area becomes that low, the performance becomes unacceptable.

In U.S. Pat. No. 5,180,703, an improved sorbent is made by adding a stabilizer to an alumina forming slurry. The preferred alumina stabilizer is silica which can be added in the form of sodium silicate. The resulting silica alumina coprecipitate is preferably filtered, washed and dried to a powder. The powder is slurried in a water/nitric acid/acetic acid mixture and dripped in a drip column containing a $NH_3$-liquid hydrocarbon phase on top of an aqueous ammonia phase. The silica stabilized alumina beads are dried and calcined and then impregnated with up to 1–20 wt % with an active ingredient of either an alkali metal or alkaline earth metal and preferably with sodium at about 4–6 wt %, by the incipient wetness technique. The beads are screened to pass through 10 mesh and remain on 20 mesh. Since a 20 mesh screen has openings of 840 microns, the particles will be at least 840 microns in diameter.

3. Need for the Invention

The beads have sodium carbonate on them. When this strong base contacts the acidic $SO_2$ present in flue gas, a very rapid acid-base reaction occurs. Initially the $SO_2$ and NO gas reacts with the sodium on the outer surface of the bead. Soon the outer surface sites are covered and then the gas must diffuse inwardly to find fresh sodium sites for reaction. This need for diffusion prior to adsorption will slow down the performance of the sorbent over time.

In order to improve the performances of the sorbent, one can keep the mass transport resistance by diffusion of the process to a minimum by employing smaller and smaller sized particles. The use of small sorbent particles no longer necessitates the deep penetration of the flue gas components into the porous structure of the sorbent by diffusion. This has the advantage that a higher removal performance can be sustained over a longer contact period on an equal sorbent weight basis than with larger sized beads. Smaller sorbent also has the advantage of a substantially higher external geometric area for the same weight of sorbent than with larger beads which contributes to the higher removal performance. Since the smaller sized sorbent has a considerably smaller entrainment velocity, it is ideally suited in a riser type reactor because it is easily carried along with the flue gas under normal process conditions.

4. Objects of the Invention

It is an object of this invention to develop a small size sorbent with a stable surface area and pore volume at process conditions in the presence of sodium or other alkali metals for use in a gas-solid contacting apparatus.

It is further object of this invention to provide a small sorbent particle having a particle size of from about 10 to 500 microns for use in adsorbing NOx and SOx from a flue gas.

It is further object of this invention to provide a stabilized surface area sorbent having a particle size smaller than about 500 microns for use in adsorbing NOx and SOx from a flue gas.

It is further object of this invention to provide a sorbent with stable surface area under hydrothermal conditions in the presence of sodium.

It is further object of this invention to provide a sorbent with low attrition characteristics.

It is further object of this invention to provide alternative processes to produce a stabilized surface area sorbent for use in adsorbing NOx and SOx from a flue gas.

It is further object of this invention to provide a process for the continued removal of nitrogen oxides and sulfur oxides from a gas containing them with a stabilized sorbent which can undergo regeneration at high temperatures and under hydrothermal conditions.

These and further objects will become apparent as the description of the invention proceeds.

SUMMARY OF THE INVENTION

A small size sorbent for NOx and SOx has been developed with a particle size ranging from about 10 to 500 microns which retains a relatively high surface area after continuous use in hydrothermal conditions. The sorbent can also adsorb other impurities such as chlorides, HCl, and heavy metals such as arsenic, lead, etc. The sorbent is preferably made by adding a stabilizer to an alumina forming slurry. A preferred alumina stabilizer is silica which can be added in the form of sodium silicate. When making alumina from a slurry, the slurry conventionally contains, for example, aluminum sulfate and sodium aluminate which react to form alumina. According to the preferred embodiment of the invention, the alumina stabilizer such as silica is further added to this slurry. The three ingredients coprecipitate. This silica alumina coprecipitate is filtered and washed. To make the spray dried particles of the present invention this powder is slurried in water. A concentrated mineral acid is added and the mixture is slurried with a high shear mixer. It is then milled in a milling device such as a Drais sand mill to reduce the average particle size to about 3–8 microns as measured by a Malvern Particle Size Analyzer. The slurried particles were then spray dried and the powder was calcined in a muffle furnace.

The silica stabilized alumina powder is impregnated with up to 1–20 wt % with an active ingredient of either an alkali metal or an alkaline earth metal and preferably with sodium at about 3–7 wt %.

DESCRIPTION OF THE PREFERRED EMBODIMENTS

Figure 1:
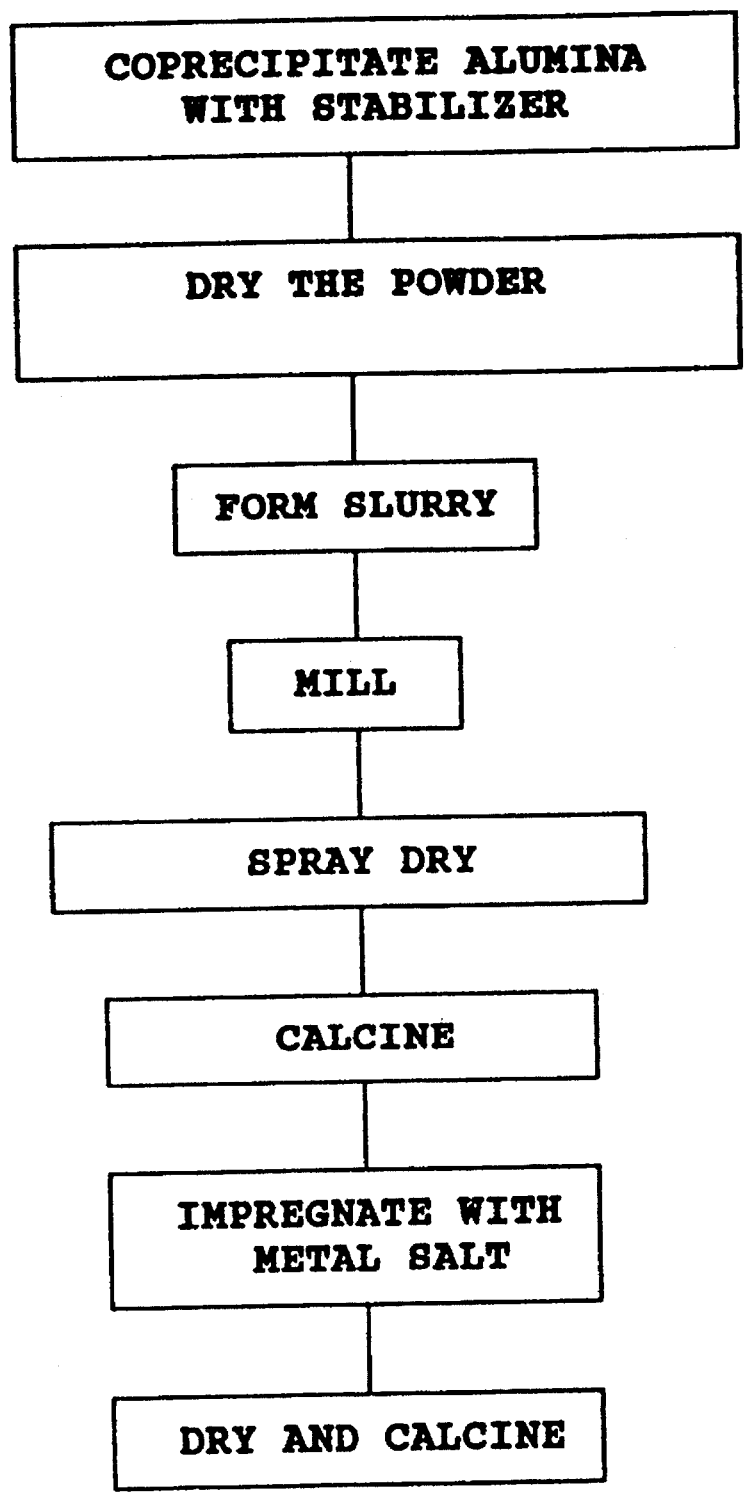
FIG. 1 is a schematic diagram of the process of making the stabilized alumina containing sorbent.

Alumina based sorbents have been developed which are capable of adsorbing NOx and SOx and other impurities from waste gases while being subjected to regeneration by heating to 650° C. These sorbents utilize an alumina stabilizer. The most preferred stabilizer is silica. Other alumina stabilizers which can be used are lanthana, rare earths other than lanthana, titania, zirconia, clay and alkaline earths such as calcium and barium either alone or in mixtures. The amount of the stabilizer is preferably from an effective stabilizing surface area amount up to about 30 mole %.

There are at least four techniques to add the stabilizer to the alumina.

If the stabilizer is mixed with alumina precursor materials without making the solution too viscous, then our preferred first embodiment for production is by co-precipitating to make the sorbent such as by co-gel formation. This technique is described by Nozemack et al in U.S. Pat. No. 4,780,446, the entire contents of which is incorporated herein by reference.

There a silica stabilized alumina is prepared as a co-gel by a precipitation process under specific and controlled reactant concentrations and reaction temperature, time, and pH. A source of an acid aluminum salt, preferably an aluminum sulfate solution, a source of alkali metal aluminate, preferably sodium aluminate solution and a source of alkaline metal silicate, preferably sodium silicate solution are combined to obtain a silica-alumina co-gel reaction mixture.

The cogellation reaction is conducted in two stages: (1) an initial co-gel is precipitated at a pH of about 7.5 to 8.5 and preferably about 8; and (2) the precipitated co-gel is stabilized at a pH of about 9.6 to 10.3 and preferably about 10.

The desired reaction pH is maintained by controlling the flow rate of the aluminum sulfate, sodium aluminate and sodium silicate reactants. Furthermore, sufficient sodium silicate is added to impart a total silica ($SiO_2$) content of the finished precipitated co-gel of from an effective stabilizing amount up to about 30 mole % and more preferably from about 5.5 to 8.5 percent by weight $SiO_2$.

Alumina stabilizers which can be added by this co-precipitation process include silica, lanthana, other rare earths, titania, zirconia, or alkaline earths such as calcium or barium.

The stabilized alumina slurry is mixed with water and a concentrated mineral acid; the mixture is slurried with a high shear mixer. It is then milled in a milling device such as a Drais sand mill to reduce the average particle size to about 3–8 microns as measured by a Malvern Particle Size Analyzer. This mixture of fine size particles is then spray dried. In a preferred embodiment they are spray dried in a 10 foot diameter Bowen gas fired spray drier. The dryer has an atomizing wheel operating at 14,500 rpm. The inlet temperature is about 700° F. and the outlet temperature is about 300° F. The powder is calcined in a muffle furnace at 1250° F. for one hour or in a rotary kiln.

The second method of adding the alumina stabilizer is to mix it with the alumina powder prior to spray drying to form the particles. All of the stabilizers including clay can be added in this procedure.

The third method of adding the alumina stabilizer is to form the alumina powder by spray drying and to then impregnate the powder with the alumina stabilizer. The stabilizer can be added either before or after the sodium is added or, to reduce production costs, it can be added along with the sodium. Again, all stabilizers can be added this way except for clay since it is not soluble.

The fourth method of adding the alumina stabilizer is to form alumina particles from a mixture of the alumina powder having a particle size less than 10 microns, the alumina stabilizer and the active ingredient. These particles are then calcined to form the sorbent. The particles can be formed by spray drying, agglomeration, granulation or by oil dripping.

The preferred method of the first embodiment is further described in terms of an improved process to manufacture the sorbent. It is illustrated in FIG. 1. A slurry is prepared using a mixture of stabilized alumina powder, water, and acids such as acetic acid and nitric acid. The significant improvement involves reducing the particle size. A preferred method of reduction is by milling to reduce the average particle size from about 10 microns to about 3–8 microns. Although the sorbent can be made without the preferred milling step, the resulting sorbent particles tend to have a higher attrition rate. Thus the particle size reduction by milling is the preferred procedure.

Other size reduction techniques can be used such as dry milling, hammer milling, ball milling and fluid energy milling. These techniques can be either wet or dry.

The slurry is fed to a 12 liter Drais Mill at a rate of about 2 liters/minute. The mill itself contains about 9 liters of 1.5 mm Quackenbush glass beads which are continuously moved around internally by disks attached to a rotating axis. Slurry particles are then grounded down to the desired particle size by the action of the glass beads. Control of particle size is established by withdrawal or addition of specific amounts of glass beads or by controlling the slurry throughput through the mill.

After milling, the slurry is spray dried. Again in a preferred embodiment the slurry is spray dried in a 10 foot diameter Bowen gas fired spray drier. The dryer has an atomizing wheel operating at 14,500 rpm. The inlet temperature is 700° F. and the outlet temperature is 300° F.

After drying, the sorbent is calcined in either a muffle furnace or an indirect fired rotary kiln. Next, impregnation with the active ingredient which is an alkali metal or an alkaline earth metal and preferably sodium as $Na_2CO_3$ is performed. This can be done in a horizontal rotary drum impregnator or in a V-blender. Finally, the sorbent is dried and calcined to yield the final product.

Figure 3:
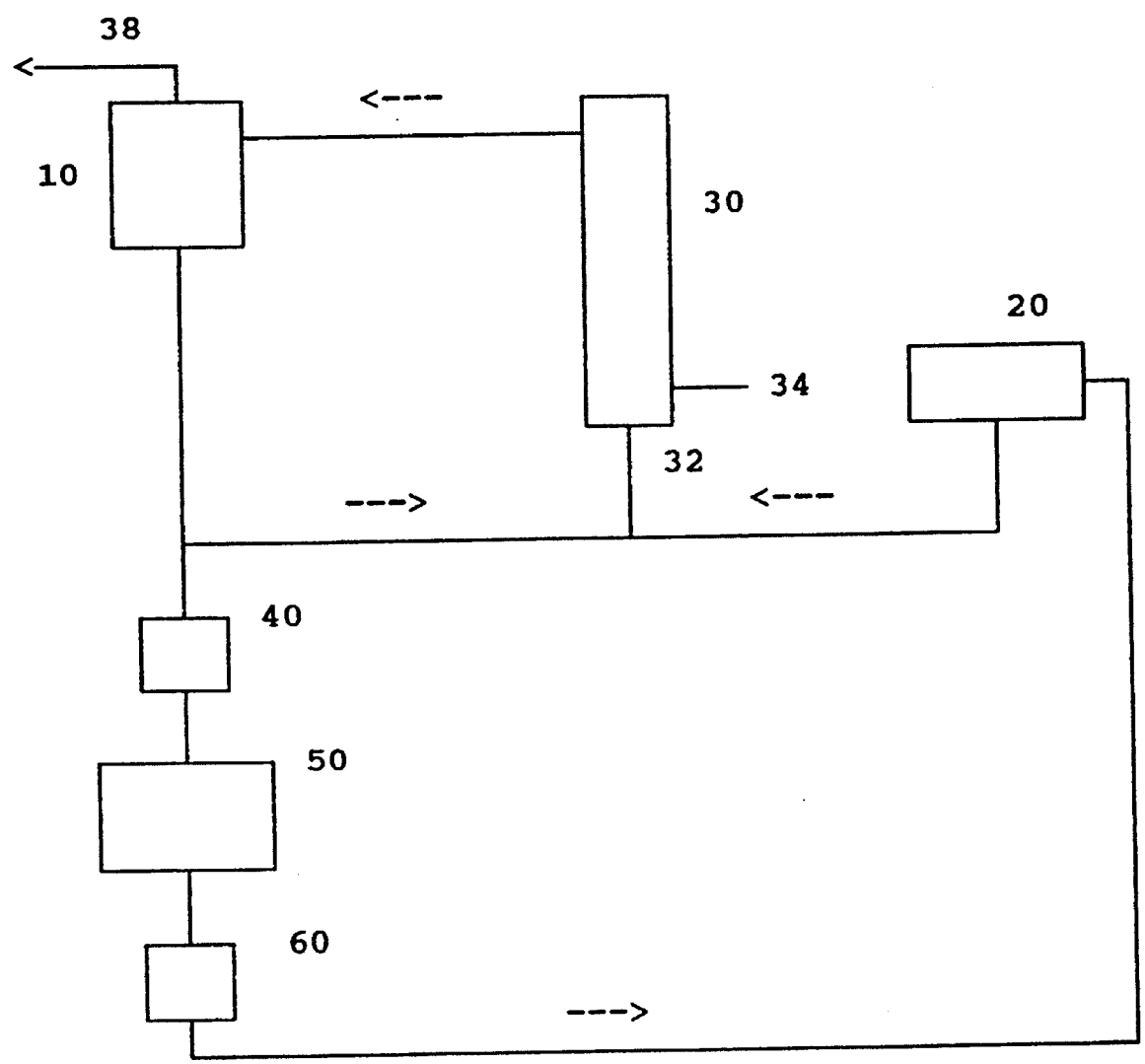
FIG. 3 illustrates an apparatus for NOx/SOx adsorption and regeneration.

The NO and $SO_2$ adsorption performance of the sorbent was measured in a riser unit as shown in FIG. 3. A mixture of catalyst from vessels 10 and 20 is fed to the riser unit 30 at a ratio of 0.8 g sorbent/g flue gas from vessel 10 and 0.2 g sorbent/g flue gas from vessel 20. The flue gas, which contains 400 ppm NO and 3,000 ppm $SO_2$, is injected at inlet 34 at 160° C. and the sorbent enters via line 32 of the reactor. They pass through a series of reactor tubes and have a residence time of about 2–3 seconds. At the exit the sorbent is removed from the gas stream using a cyclone separator in vessel 10.

Every 20 minutes, 103 grams of sorbent are removed from vessel 10 for regeneration. During the regeneration the spent sorbent is transferred to vessel 40 of the regenerator section. The contents of vessel 40 are gravity fed to the regenerator 50 where the sorbent is regenerated with methane which is saturated with water (1.7 vol %) at a temperature of 650° C. The regenerated sorbent is stored in holding vessel 60 where the sorbent is cooled down to and then returned to vessel 20.

Attrition

A useful measure of the physical integrity is the Davison Index for attrition for very small particles. This is determined using an Amico roller particle size analyzer fitted with a one inch (i.d.) jet cup with a 0.0625 inch orifice. In a 60 minute test at an air flow rate of 21 liters per minute on a 20+μm sample, the Davison Index value is equal to the percentage of 0 to 20 micron-sized material formed as a fraction of the original sample. According to this measure, the ultimate alumina particles of the current invention should have a maximum Davison Index for attrition value of about 20% or less. Preferably, these values will be less than 10% and, most preferably, less than 5%.

Surface Area

The surface areas referred to throughout this specification and claims are the nitrogen BET surface areas determined by the method described in the article by S. Brunauer, P. Emmett, and E. Teller, J. Am. Chem. Soc., Vol. 60, p. 309(1938). This method depends on the condensation of nitrogen into the pores, and is effective for measuring pores with pore diameters in the range of 10 to 600 Å. The volume of nitrogen adsorbed is related to the surface area per unit weight of the support.

Total Porosity

The pore size distribution within the activated spheroidal particle and total porosity is determined by mercury porosimetry. The mercury intrusion technique is based on the principle that the smaller a given pore the greater will be the pressure required to force mercury into that pore. Thus, if an evacuated sample is exposed to mercury and pressure is applied incrementally, the reading of the mercury volume disappearing at each increment allows to determine the pore size distribution. The relationship between the pressure and the smallest pore through which mercury will pass at the pressure is given by the Kelvin equation:

$$r = 2\sigma \cos \theta / P$$

where r=the pore radius
σ=surface tension
θ=contact angle
P=pressure

Using pressures up to 60,000 p.s.i.g. and a contact angle of 130°, the range of pore diameters encompassed is 35–10,000 Å.

Mercury porosimetry measures the total mercury pore volume in cm$^3$/g. When considering the porosity of particles in a container, there is additional porosity contributed by the void space between the particles. However, by just considering the pore volume in pores below 1000 Å, one tends to eliminate the larger interparticle voids.

Hydrothermal Stability

The BET surface area stability of the sorbent under hydrothermal conditions is measured by subjecting the sorbent to a 100 volume % steam atmosphere at 650° C. and the surface area is measured at regular intervals. Using this test the sorbent should retain at least 50 m$^2$/g of surface area after 2,000 hours in the steam and preferably greater than 100 m$^2$/g. Sorbents made according to the present invention have maintained values of over 140 m$^2$/g after 1000 hours.

Having described the basic aspects of our invention, the following examples are given to illustrate specific embodiments thereof.

EXAMPLE 1

This example illustrates the production of an unstabilized alumina powder to be used as a comparison.

Following the procedure described in U.S. Pat. No. 4,154,812 an alumina powder was produced. This powder is commercially available as SRA Alumina from Davison Chemical Division of W. R. Grace & Co.-Conn. The average particle size of the powder is 15–20 microns when measured by the Malvern Particle Analyzer.

EXAMPLE 2

This example illustrates the preparation of a stabilized alumina powder to be used in the present invention.

Following the procedure described in U.S. Pat. No. 4,780,446 a silica stabilized alumina powder was produced. The powder contained 6.5% silica. The average particle size of the powder is 15–20 microns when measured by the Malvern Particle Analyzer.

EXAMPLE 3

This example illustrates the production of the sorbent according to the present invention.

One hundred pounds of the silica stabilized alumina described in Example 2 was slurried in water. Since the total volatiles of the powder was 28%, the silica stabilized alumina on a dry basis was 72 pounds. To this was added 6.35 pounds of 70% concentrated nitric acid to peptize the alumina. The mole ratio of HNO$_3$ to alumina was 0.1:1. The powder was reslurried with a high shear mixer for 20 minutes. The slurry was then milled in a Drais sand mill. The mill has 1.5 mm glass grinding media and was operated at 3 liters/minute milling rate with 80% chamber load. The average particle size was reduced to about 5.6 microns as measured by a Malvern Particle Size Analyzer.

The particles were spray dried in a 10 foot diameter Bowen gas fired spray drier. The dryer has an atomizing wheel operating at 14,500 rpm. The inlet temperature is 700° F. and the outlet temperature is 300° F. The powder was calcined in a muffle furnace at 1250° F. for one hour.

The silica stabilized alumina particles were impregnated to 3.5 wt % sodium using sodium carbonate by the incipient wetness technique. This technique involves permitting the powder to adsorb an amount of liquid equivalent to 80–100% of its pore volume. The particles were then dried at 120° C. in a vacuum oven and air calcined at 1000° F. for one hour. The particles had a surface area of 224 m$^2$/g, a total porosity measured by mercury in pore diameters of less than 1,000 Å of 0.455 cm$^3$/g, and a Davison Index for attrition of 3%.

COMPARISON EXAMPLE 4

A spray dried alumina was prepared in the same manner as given in Example 3, except that the alumina powder from Example 1 was used which does not contain any silica. When it was initially slurried 20 gallons of water were used instead of 30 gallons, to obtain the desired viscosity. It was spray dried and impregnated to the same level of sodium and afterwards dried and calcined under the conditions given in Example 3.

The particles had a surface area of 129 $m^2/g$, a total porosity measured by mercury in pore diameters of less than 1,000 Å of 0.355 $cm^3/g$ and a Davison Index for attrition of 3%.

Figure 2:
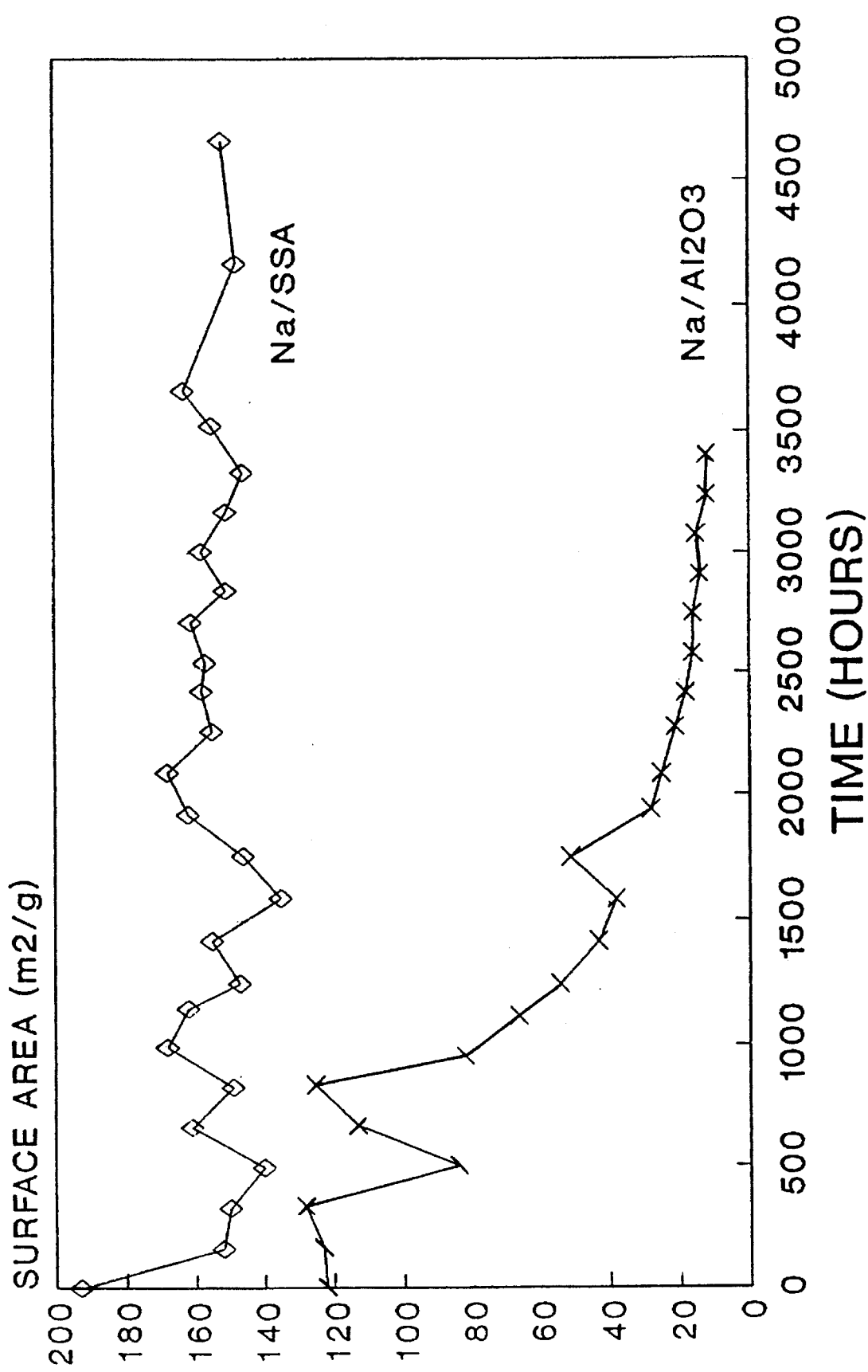
FIG. 2 illustrates the stability of the sorbents to steam.

The samples of the sodium impregnated silica stabilized alumina (Na/SSA) from Example 3 and the sodium impregnated alumina (Na/$Al_2O_3$) from this Comparison Example 4 were each exposed to 100 vol% steam at 650° C. After about 1000 hours the sodium impregnated alumina showed a steep decline of surface area as illustrated in FIG. 2. The sodium impregnated silica stabilized alumina (Na/SSA) of Example 3, made according to the present invention, still maintained a surface area of 140 $m^2/g$ after 4,000 hours as illustrated in FIG. 2.

It is understood that the foregoing detailed description is given merely by way of illustration and that many variations may be made therein without departing from the spirit of this invention.

What is claimed is:

1. In a process for continued removal of nitrogen oxide and sulfur oxides from a gas containing them with a sorbent and for the regeneration of the sorbent, the improvement comprising using as the sorbent an active ingredient containing stabilized alumina sorbent capable of absorbing NOx arid SOx and other impurities from waste gases and being regenerated comprising stabilized alumina particles having a particle size of from 10 to 500 microns;

a surface area of about at least 50 square meters per gram;

a Davison Index for attrition value of less than 20%;

silica in an effective alumina stabilizing amount; and an active ingredient of a metal selected form the group consisting of alkali metals, alkaline earth metals and mixtures thereof and present in an amount of from about 1 to 20 wt%; and said sorbent when subjected to a Hydrothermal Stability procedure where the sorbent is subjected to a 100 volume % steam at 650° C., maintaining BET surface area of at least 50 $m^2/g$ following 2000 hours in the steam.

2. The process of claim 1 wherein the active ingredient is sodium present in an amount of from about 3–7 wt%.

3. The process of claim 1 wherein the BET surface area under the Hydrothermal Stability procedure is at least 100 $m^2/g$.

4. The process of claim 1 wherein the BET surface area under the Hydrothermal Stability procedure is at least 140 $m^2/g$.

* * * * *

UNITED STATES PATENT AND TRADEMARK OFFICE
CERTIFICATE OF CORRECTION

PATENT NO. : 5,585,082
DATED : December 17, 1996
INVENTOR(S) : Ziebarth et al

It is certified that error appears in the above-indentified patent and that said Letters Patent is hereby corrected as shown below:

At column 1, before "BACKGROUND OF THE INVENTION" and after "now, U.S. Pat. No. 5,427,995." at line 5, please insert the following as a separate paragraph, --This invention was made with Government support under subcontract no. QZ002 with W. R. Grace & Company under Contract No. DE-AC22-89PC88889 with M-K Ferguson Company awarded by the Department of Energy. The Government has certain rights in this invention.--

Signed and Sealed this

Fourteenth Day of September, 1999

Attest:

Q. TODD DICKINSON

*Attesting Officer*  *Acting Commissioner of Patents and Trademarks*